United States Patent [19]
Butterworth

[11] Patent Number: 5,250,159
[45] Date of Patent: Oct. 5, 1993

[54] BIPOLAR MEMBRANE STACK AND METHOD FOR PRODUCING ACID AND MONOVALENT BASE FROM IMPURE SALT

[75] Inventor: Donald J. Butterworth, Stirling, N.J.

[73] Assignee: The Graver Company, Union, N.J.

[21] Appl. No.: 713,809

[22] Filed: Jun. 12, 1991

[51] Int. Cl.$^5$ .............................................. B01D 61/44
[52] U.S. Cl. ..................................... 204/98; 204/103; 204/182.4; 204/182.5; 204/301
[58] Field of Search .................. 204/182.4, 182.5, 301, 204/98, 103

[56] References Cited

U.S. PATENT DOCUMENTS

| | | | |
|---|---|---|---|
| 2,923,674 | 2/1959 | Kressman | 204/180 |
| 2,943,989 | 7/1960 | Kollsman | 204/301 |
| 2,981,671 | 4/1961 | Griffiths | 204/180 |
| 3,085,970 | 4/1963 | Davis | 204/301 |
| 4,116,889 | 9/1978 | Chlanda et al. | 204/182.4 |
| 4,465,573 | 8/1984 | O'Hare | 204/180 |
| 4,715,939 | 12/1987 | Ball et al. | 204/182.4 |
| 4,880,513 | 11/1989 | Davis et al. | 204/182.4 |
| 4,999,095 | 3/1991 | Chlanda et al. | 204/182.4 |

OTHER PUBLICATIONS

Noyes Data Corporation, Membrand and Ultrafiltration Technology, Chemical Technology Review No. 147, pp. 201-202. no date provided.

Primary Examiner—John Niebling
Assistant Examiner—Arun S. Phasge
Attorney, Agent, or Firm—Dressler, Goldsmith, Shore, Sutker & Milnamow, Ltd.

[57] ABSTRACT

A method and bipolar membrane stack for the generation of acid and alkali metal base solutions from an impure salt by electrodialysis. The unit cells of the stack comprise a novel arrangement of cation-selective membranes and an anion selective membrane with relation to a bipolar membrane forming four liquid flow channels. One of the cation-selective membranes is monocation-selective, passing monovalent cations while blocking the passage of multivalent cations. The method is operable continuously using untreated raw material brines contaminated with multivalent cation salts to generate substantially pure alkali metal base solutions.

7 Claims, 2 Drawing Sheets

BIPOLAR MEMBRANE STACK AND METHOD FOR PRODUCING ACID AND MONOVALENT BASE FROM IMPURE SALT

BACKGROUND OF THE INVENTION

This invention relates generally to electrodialysis of a salt solution for generating acid and base solutions and, more particularly, to an improved method and four channel bipolar membrane stack for producing acid and monovalent base from untreated, impure salt.

It is well known in the art that acid and base solutions may be generated from a salt solution by the electrodialysis water splitting process. In general, the electrodialysis process consists of a stack containing a plurality of cation-selective membranes, bipolar membranes, and anion-selective membranes positioned between a pair of electrodes. The stack itself comprises an assembly of a plurality of unit cells, each unit cell comprising the said membranes arranged to provide a plurality of parallel flow paths or channels therebetween. When a direct electrical current is applied to the bipolar membrane, water is split into hydroxyl ions and hydrogen ions which migrate or travel to the anode and cathode respectively. At the same time, the cation-selective membrane passes cations traveling toward the cathode while blocking anions, and the anion-selective membrane passes anions traveling toward the anion while blocking cations. If a salt solution such as sodium chloride is directed through the channel between the cation and anion-selective membranes, the concentration of that solution is depleted as hydrochloric acid and sodium hydroxide are formed in adjacent acid and base containing channels. With suitable controls, pumps and associated collecting vessels, the acid and base may be withdrawn for subsequent use and the concentration of the salt solution replenished as required.

An electrodialysis process of the type indicated is fully described in the commonly assigned U.S. Pat. No. 4,880,513, and the teachings of that patent are incorporated herein by reference. The method disclosed in said patent is a fill and draw or batch method wherein various controls, such as pH and liquid level switches are utilized to periodically withdraw the desired acid and base and replenish the raw material salt solution. That process also utilizes a common bipolar membrane stack consisting of three-channel unit cells comprising a bipolar membrane having an anion-selective membrane on one side thereof and a cation-selective membrane on the opposite side thereof.

The production of acid and monovalent base, such as hydrochloric acid and sodium hydroxide or sulfuric acid and potassium hydroxide, in an electrochemical cell requires the raw material salt (i.e., sodium, chloride or potassium sulfate) to be virtually free of multi-valent cations like calcium, magnesium and iron. Calcium and magnesium will precipitate in the cation-exchange membrane of these cells in a high pH environment leading to irreversible damage to the cation-exchange membrane. This problem is inherent in the production of chlorine and caustic in an electrochemical cell and, more particularly, in the production of hydrochloric acid and sodium hydroxide in the typical three-channel bipolar membrane stack.

A raw material salt, like sodium chloride, is most frequently contaminated with salts of calcium and magnesium. Similarly, raw material potassium sulfate is contaminated generally with iron salts. In an effort to eliminate the problem, current practice dictates that sodium chloride brines be pre-treated, by precipitation processes and ion exchange, to remove calcium and magnesium ions. Such methods are expensive and time-consuming, requiring additional equipment, chemicals and manpower to rid the brine of the unwanted impurities. In addition, a waste stream is created by the pre-treatment methods that requires treatment prior to disposal. The same type of pre-treatment and problems are inherent in the case of raw potassium sulfate contaminated with iron.

There thus exists a need for a method and apparatus that permits the production of sodium hydroxide or potassium hydroxide from raw and untreated salts containing multivalent cations like calcium, magnesium or iron, which would normally precipitate within a cation-exchange membrane in a high pH environment, eventually damaging said membrane.

SUMMARY OF THE INVENTION

The present invention provides an improved method and a novel bipolar membrane stack for production of alkali metal hydroxides from a salt by electrodialysis. The invention allows impure brines to be fed directly to an electro-chemical stack without pretreatment. The method is thus most cost-efficient and is also operable on a continuous basis.

More specifically, the invention comprises an electrodialytic unit cell having four flow paths or channels and a bipolar membrane stack comprising a plurality of such unit cells. Each unit cell comprises a first cation-selective membrane spaced from the anion-selective face of the bipolar membrane, an anion-selective membrane spaced from the cation-selective face of the bipolar membrane, a second cation-selective membrane spaced from the anion-selective membrane, and a third cation-selective membrane spaced from the second cation-selective membrane. The five membranes thereby form four flow channels in the unit cell. The second cation-selective membrane differs from the other two in that it is monovalent cation selective, that is, it permits passage of monovalent cations while it blocks passage of multivalent cations. In a stack of unit cells, the third cation-selective membrane functions as the first cation-selective membrane of the next adjacent unit cell.

In accordance with a preferred form of the invention, the brine comprising raw and untreated salt material, such as sodium chloride or potassium sulfate, is directed through the third channel, namely the one formed by the anion-selective membrane and the monovalent cation-selective membrane. The fourth channel is initially charged with a solution of the purified monovalent cation salt. Water is fed through all four channels and, when direct current is applied, the corresponding base and acid are generated and respectively flow in the first and second channels, while purified salt free of the multivalent cation impurities continues to flow in the fourth channel. The contaminated salt becomes depleted of monovalent cations and is continuously replenished and maintained in a saturated salt condition. It has been found that the concentration of the pretreated salt in the fourth channel remains essentially constant owing to equal quantities of monovalent cations entering and leaving this channel.

The described method is operable on a continuous basis and is highly economical in eliminating the previously required pretreatment of the raw salt material.

Other features and advantages of the invention will be apparent from the following description of a preferred embodiment thereof and the appended claims.

DESCRIPTION OF A PREFERRED EMBODIMENT

Figure 1:
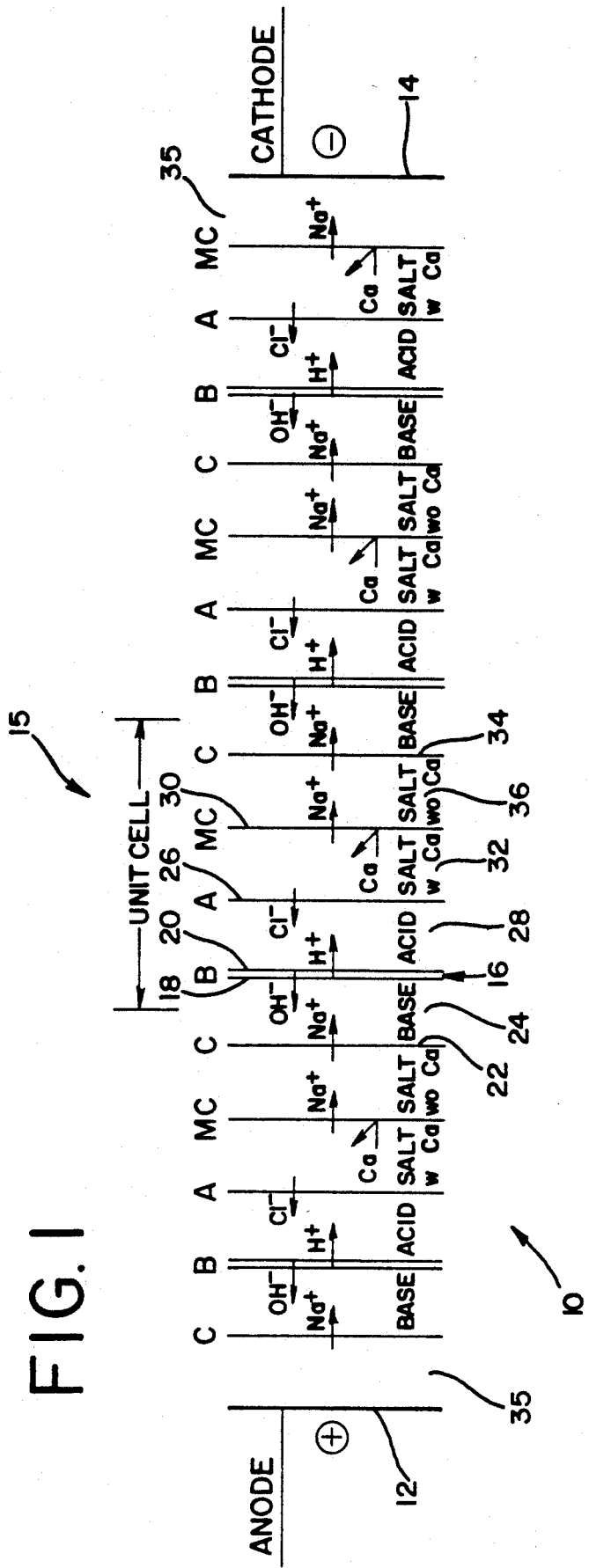
FIG. 1 is a schematic representation of an electrodialytic bipolar membrane stack embodying the principles of the invention.

Referring in detail to FIG. 1, a schematic representation of an electrodialytic bipolar membrane stack 10 embodying the principles of the invention is shown. The stack 10 comprises a multiplicity of unit cells 15 and the ends of the stack are in electrical contact with a direct current anode electrode 12 and cathode electrode 14.

Each unit cell 15 comprises a bipolar membrane 16 having an anion-selective face 18 directed toward the anode 12 and a cation-selective face 20 directed toward the cathode 14. A first cation-selective membrane 22 is spaced from the anion-selective face 18 and forms therebetween a first flow channel 24. An anion-selective membrane 26 is spaced from the cation-selective face 20 and forms therebetween a second flow channel 28. A monovalent cation selective membrane 30 is spaced from the anion-selective membrane 26 and forms therebetween a third flow channel 32. A third cation-selective membrane 34, which also comprises the first cation-selective membrane of the next adjacent unit cell, is spaced from the membrane 30 and forms therebetween a fourth flow channel 36. Electrode rinse channels 35 are provided between the electrodes 12 and 14 and their associated ion-exchange membranes.

Operation of the method of the invention is continuous and all of the liquids are continuously recirculating. Fourth channel 36 is initially charged with a solution of the pretreated particular raw material salt, for example sodium chloride. Untreated raw material sodium chloride solution typically containing contaminant multivalent cations like calcium and magnesium is circulated through the third channel 32. Water, initially, is circulated through the first and second channels 24 and 28. Application of DC current to the stack 10 causes sodium hydroxide to form in the first channel 24 and hydrochloric acid to form in the second channel 28, thereby depleting the contaminated salt solution in channel 32 of its sodium ions. However, salts of the multivalent cations remain behind in the third channel.

During continuous operation and recirculation of the various liquids, saturated raw material sodium chloride salt solution is constantly being added to channel 32 to maintain the raw material as a saturated solution. As base and acid are withdrawn from the channels 24 and 28 respectively, water is added to those channels to maintain the desired concentrations. It will be noted that the quantity of uncontaminated sodium chloride solution remains substantially constant because substantially equal numbers of sodium ions enter and leave the fourth channel 36. Over extended periods of operation of the stack, there may be some loss of concentration of the purified salt caused by leakage of anions through the membranes so that the occasional addition of nominal amounts of purified sodium chloride may be required to maintain the optimum concentration for most efficient operation.

Figure 2:
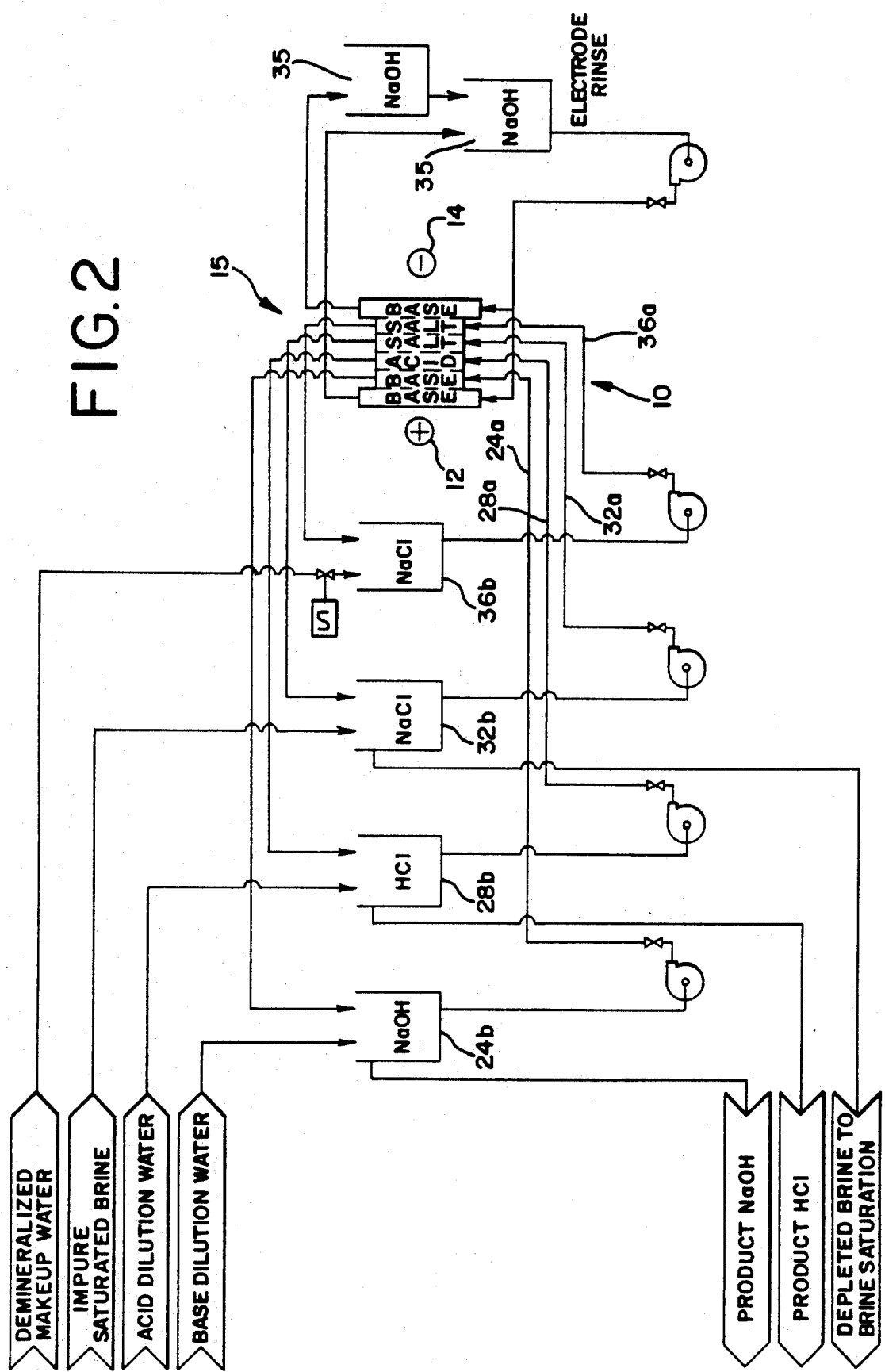
FIG. 2 is a flow diagram illustrating the method of operation according to the invention.

Referring now to FIG. 2, the flow diagram illustrates the method embodying the principles of the invention. A stack 10, only partially shown, is comprised of a number of unit cells 15. Each unit cell comprises four channels 24, 28, 32 and 36 as previously described and illustrated in FIG. 1. Suitable pumps and valves are associated with the flow channels as indicated, with lines 24a, 28a, 32a and 36a carrying solutions to their respective channels. Solution tanks 24b, 28b, 32b and 36b are associated with the flow channels and form operational loops with their respective channels. It will be noted that water is fed into channels 24 and 28 for diluting the base and acid being formed. Makeup water, preferably demineralized, is added as required into channel 36 for maintaining the proper concentration and purity of the sodium chloride solution. At the same time, a saturated solution of the impure brine raw material is added into channel 32. Alternatively, the water and various solutions may be added to their respective tanks 24b, 28b, 32b and 36b. The product sodium hydroxide is removed continuously as overflow from the tank 24b and the product hydrochloric acid is removed continuously as overflow from the tank 28b. The overflow from tank 32b comprises the sodium ion-depleted salt which is recycled through a source of the impure brine (not shown) to continuously reintroduce substantially saturated impure sodium chloride salt solution into the channel 32. The rate of flow of water and impure salt solution into the respective channels is substantially greater than the rate of overflow removal of products. Preferably, the ratio of input flow rate to output or product flow rate is on the order of 10 to 1.

While the invention and illustrative Figures herein have been described in connection with the salt sodium chloride, it should be appreciated that the invention is equally applicable to other common monovalent cation salts, such as potassium chloride and potassium sulfate.

The various membranes employed in the invention are available as standard articles of manufacture. For example, suitable bipolar membranes and monovalent cation-selective membranes are known to be manufactured by Allied Corporation, Tokuyama Soda and WSI Technologies.

From the foregoing description, it should be apparent that the invention provides a novel method and four-channel bipolar membrane stack for the electrodialytic generation of base and acid solutions directly from impure raw material monovalent cation salts which are generally contaminated with multivalent cation compounds, including calcium, magnesium and iron. Thus, the invention eliminates the need for expensive and time-consuming pretreatment of the impure salt in order to prevent damage to the membranes. The invention may be efficiently operated in continuous mode. It should also be understood that the language employed herein is for purposes of description rather than limitation, and various changes can be made without departing from the spirit or scope of the invention which is defined in the appended claims.

I claim:

1. An electrodialysis stack for the generation of acid and base solutions from a salt solution including a plurality of unit cells assembled for operational positioning between anode and cathode electrodes, each unit cell comprising:

a bipolar membrane having an anion-selective face facing toward said anode and a cation-selective face facing toward said cathode;

an anion-selective membrane and at least two cation-selective membranes arranged about said bipolar membrane and forming at least four liquid flow channels;

a first cation-selective membrane being spaced from the anion-selective face of said bipolar membrane and the anion-selective membrane being spaced from the cation-selective face of said bipolar membrane, thereby respectively forming first and second liquid flow channels;

a second cation-selective membrane being spaced from said anion-selective membrane and forming therewith a third liquid flow channel; and a third cation-selective membrane being spaced from said second cation-selective membrane and forming therewith the fourth liquid flow channel, said third cation-selective membrane comprising the first cation-selective membrane of the next adjacent unit cell.

2. An electrodialysis stack according to claim 1 wherein said second cation-selective membrane is monocation-selective permitting the passage of monovalent cations while blocking the passage of multivalent cations.

3. A method of generating an acid solution and a base solution by electrodialysis of a salt solution which comprises:

using an electrodialysis cell comprising an anode and a cathode and a unit cell defining a plurality of liquid flow channels disposed between the anode and cathode;

circulating a base solution through a first flow channel formed by a first cation-selective membrane and the anion-selective face of a bipolar membrane;

circulating an acid solution through a second flow channel formed by an anion-selective membrane and the cation-selective face of the bipolar membrane;

circulating a raw material salt solution through a third channel formed by a second cation-selective membrane and the anion-selective membrane, said second cation-selective membrane is monocation-selective permitting the passage of monovalent cations while blocking the passage of multivalent cations and said raw material salt solution contains multivalent cations;

circulating a solution of a salt having the cation of said base solution through a fourth channel formed by a third cation-selective membrane and the second cation-selective membrane, said third cation-selective membrane comprises the first cation-selective membrane of a next adjacent unit cell; and applying a direct current across the anode and cathode.

4. A method for generating an acid solution and an alkali metal base solution by electrodialysis of an impure alkali metal salt solution containing salts of multivalent cations in a bipolar membrane stack having a plurality of at least four-channel unit cells comprising:

continuously circulating the acid solution through an acid flow channel, the base solution through a base flow channel and the impure metal salt solution through an impure metal salt channel in each of the unit cells; and continuously circulating a purified solution of the alkali metal salt through a fourth channel in each of said unit cells, the alkali metal base solution formed being substantially free of multivalent cations and the cell membranes being substantially free of precipitated multivalent cation salts.

5. A method according to claim 4 wherein each unit cell comprises a bipolar membrane having an anion-selective face and a cation-selective face;

the base flow channel being formed by a first cation-selective membrane spaced from the anion-selective face of the bipolar membrane;

the acid flow channel being formed by a first anion-selective membrane spaced from the cation-selective face of the bipolar membrane;

the impure metal salt solution flow channel being formed by a monovalent cation-selective membrane spaced from the anion-selective membrane; and the pure salt solution flow channel being formed by a fist cation-selective membrane of the next adjacent unit cell spaced from the monovalent cation-selective membrane.

6. A method according to claim 5 wherein the impure salt comprises sodium chloride containing salts of calcium or magnesium.

7. A method according to claim 5 wherein the impure salt comprises potassium sulfate containing salts of iron.

* * * * *